US008245158B1

(12) United States Patent
Schrick

(10) Patent No.: US 8,245,158 B1
(45) Date of Patent: Aug. 14, 2012

(54) SYSTEM AND METHOD FOR PROVIDING A KEYBOARD TYPE INTERFACE FOR A COMPUTING DEVICE

(76) Inventor: Brad Schrick, Palo Alto, CA (US)

( * ) Notice: Subject to any disclaimer, the term of this patent is extended or adjusted under 35 U.S.C. 154(b) by 335 days.

(21) Appl. No.: 10/385,818

(22) Filed: Mar. 10, 2003

Related U.S. Application Data

(60) Provisional application No. 60/363,165, filed on Mar. 11, 2002.

(51) Int. Cl.
*G06F 3/14* (2006.01)
*G06F 3/048* (2006.01)

(52) U.S. Cl. ........ 715/864; 715/710; 715/764; 715/768; 715/780

(58) Field of Classification Search ................. 345/864; 715/864, 710, 764, 768, 780
See application file for complete search history.

(56) References Cited

U.S. PATENT DOCUMENTS

| | | | |
|---|---|---|---|
| 3,940,758 A | 2/1976 | Margolin | 340/337 |
| 4,378,553 A | 3/1983 | McCall | 340/365 |
| 4,495,490 A * | 1/1985 | Hopper et al. | 345/469 |
| 5,044,798 A | 9/1991 | Roylance et al. | 400/472 |
| 5,122,786 A | 6/1992 | Rader | 340/711 |
| 5,278,779 A | 1/1994 | Conway | |
| 5,351,066 A | 9/1994 | Rucker et al. | 345/168 |
| 5,365,606 A | 11/1994 | Brocker et al. | 395/650 |
| 5,426,449 A | 6/1995 | Danziger | 345/168 |
| 5,497,151 A * | 3/1996 | Dombroski | 341/22 |
| 5,502,460 A | 3/1996 | Bowen | 345/168 |
| 5,515,305 A * | 5/1996 | Register et al. | 708/145 |
| 5,564,560 A * | 10/1996 | Minelli et al. | 200/516 |
| 5,613,786 A | 3/1997 | Howell et al. | 400/489 |
| 5,661,505 A | 8/1997 | Livits | 345/169 |
| 5,667,319 A | 9/1997 | Satloff | 400/472 |
| 5,674,180 A * | 10/1997 | Yabe et al. | 600/122 |
| 5,675,329 A * | 10/1997 | Barker et al. | 341/22 |
| 5,717,431 A | 2/1998 | Chia-Ying et al. | 345/168 |
| 5,745,056 A | 4/1998 | Takahashi et al. | 341/22 |
| 5,754,395 A | 5/1998 | Hsu et al. | 361/680 |
| 5,764,180 A | 6/1998 | Cummings | 341/176 |
| 5,767,463 A | 6/1998 | Gandre | 200/5 |
| 5,790,103 A | 8/1998 | Willner | 345/168 |
| 5,861,872 A | 1/1999 | Stohr et al. | 345/156 |

(Continued)

OTHER PUBLICATIONS

IBM Corporation User System Ergonomic Research on the Half-Keyboard Computer, www.almaden.ibm.com, printed Jun. 26, 2001.

(Continued)

*Primary Examiner* — Weilun Lo
*Assistant Examiner* — Shashi Becker
(74) *Attorney, Agent, or Firm* — Fliesler Meyer LLP

(57) ABSTRACT

A system and method for providing an interface for an electronic or computing device. In one embodiment, the invention includes a keyboard positioned adjacent to the posterior side of the computing device in such a way that the user can operate the device in an easy and convenient manner, while at the same time maximizing the amount of available display space to the user viewing the anterior side of the device. In this embodiment the user operates the keyboard while it is hidden from view behind the display. The invention also provides several mechanisms that allow the user to become familiar with this approach to operating the device, some of which are applicable to the improvement of standard keyboards for many common purposes and uses. These mechanisms include, but are not limited to, appropriately spaced keys, chorded keyboards, tactile feedback mechanisms, and key indication, selection and verification methods.

24 Claims, 10 Drawing Sheets

U.S. PATENT DOCUMENTS

| | | | |
|---|---|---|---|
| 5,874,906 A | 2/1999 | Willner et al. | 341/22 |
| 5,880,715 A | 3/1999 | Garrett | 345/163 |
| 5,892,499 A | 4/1999 | Vulk, Jr. | 345/156 |
| 5,902,257 A | 5/1999 | Korth | 601/23 |
| 5,917,476 A * | 6/1999 | Czerniecki | 345/173 |
| 5,936,555 A | 8/1999 | Zagnoev | 341/22 |
| 5,941,648 A * | 8/1999 | Robinson et al. | 400/82 |
| 5,949,401 A | 9/1999 | Kazarian | 345/156 |
| 5,995,026 A * | 11/1999 | Sellers | 341/34 |
| 6,005,496 A | 12/1999 | Hargreaves et al. | 341/22 |
| 6,031,469 A | 2/2000 | Dodd | 341/22 |
| 6,056,458 A | 5/2000 | Lin | 400/477 |
| 6,057,788 A | 5/2000 | Cummings | 341/22 |
| 6,073,036 A * | 6/2000 | Heikkinen et al. | 455/550.1 |
| 6,088,022 A | 7/2000 | Rakoski | 345/168 |
| 6,102,594 A * | 8/2000 | Strøm | 400/486 |
| 6,127,949 A | 10/2000 | Dodd | 341/22 |
| 6,132,118 A | 10/2000 | Grezeszak | 400/489 |
| 6,144,551 A | 11/2000 | Kao | 361/681 |
| 6,153,843 A | 11/2000 | Date et al. | 200/339 |
| 6,168,331 B1 | 1/2001 | Vann | 400/472 |
| 6,189,056 B1 | 2/2001 | Ogura et al. | 710/62 |
| 6,198,053 B1 | 3/2001 | Chou | 200/5 |
| 6,215,419 B1 | 4/2001 | Leman | 341/22 |
| 6,218,966 B1 | 4/2001 | Goodwin et al. | |
| 6,297,752 B1 * | 10/2001 | Ni | 341/22 |
| 6,680,677 B1 * | 1/2004 | Tiphane | 341/22 |
| 6,693,626 B1 | 2/2004 | Rosenberg | |
| 6,723,937 B2 | 4/2004 | Englemann et al. | |
| 6,803,905 B1 | 10/2004 | Capps et al. | |
| 6,882,337 B2 | 4/2005 | Shetter | |
| 6,909,424 B2 * | 6/2005 | Liebenow et al. | 345/169 |
| 7,131,780 B2 * | 11/2006 | Hirsch | 400/485 |
| 7,805,022 B2 * | 9/2010 | Tanaka | 382/298 |
| 2003/0056278 A1 * | 3/2003 | Kuo et al. | 2/160 |
| 2006/0053387 A1 | 3/2006 | Ording | |

OTHER PUBLICATIONS

Matias Corporation Product information on the halfkeyboard™, www.halfkeyboard.com, printed Jun. 26, 2001 including "Matias Half Keyboard—How it works", "Matias Wearable Half Keyboard" and "Matias Half Keyboard Research".

Matias, Edgar et al. "A Wearable Computer for Use in Microgravity Space and Other Non-Desktop Environments," *Companion of the CHI '96 Conference on Human Factors in Computing Systems*, 1996, pp. 69-70, New York: ACM.

Matias, Edgar et al. "One-Handed Touch-Typing on a QWERTY Keyboard," *Human Computer Interaction*, 1996, vol. 11, pp. 1-27.

Matias, Edgar et al. "Half-QWERTY: Typing With One Hand Using Your Two-handed Skills," *Companion of the CHI '94 Conference on Human Factors in Computing Systems*, 1994, pp. 51-52, New York: ACM.

Matias, Edgar et al. "Half-QWERTY: A One-handed Keyboard Facilitating Skill Transfer From QWERTY," *Proceedings of the INTERCHI '93 Conference on Human Factors in Computing Systems*, 1994, pp. 88-94, New York: ACM.

Think Outside Product information on the Stowaway™ Portable Keyboard, www.thinkoutside.com, printed Jun. 27, 2001.

Filewalker Product Description "PDA designed for one-handed use: INVAIR Presents the future of the PDA," www.invair.de, printed on Aug. 20, 2003.

Peterson, Robyn "Keyboard Kraziness & Mouse Madness: A week of Wacky Input Devices," www.extremetech.com, Apr. 21, 2003.

Kerr et al., Apple Patent App: Touch Sensitive iPod with Multiple Touch Sensitive Surfaces, www.hrmpf.com, Sep. 8, 2006, 8 pages.

Cook, "Apple Patents 'Touch Sensitive Bezel for User Interface'", www.ipodobserver.com, Oct. 27, 2006, 5 pages.

Sellers, "Apple Files Patent for Multipoint Touchscreen for Table PC, iPod, More", www.macimumnews.com, May 11, 2006, 6 pages.

O'Grady, "Apple Patent Describes New Interface for Ipod", www.powerpage.org, Oct. 27, 2006, 5 pages.

Lane, "Apple Filing Reveals Multi-Sided iPod with Touch Screen Interface", AppleInsider, May 10, 2007, 4 pages.

Ording, "Apple's Touchscreen Virtual Keyboard Interface", www.hrmpf.com, Mar. 9, 2006, 11 pages.

Unknown, "Introducing the Wireless Mighty Mouse", www.apple.com, 2 pages.

Topolsky, "Microsoft R&D Strikes Again: the LucidTouch", www.engadget.com, Aug. 24, 2007, 3 pages.

Hafner, "Now Preening on the Coffee Table: The TiVo Remote Control", New York Times, Feb. 19, 2004, 6 pages.

Lombardi, "Virtual Keyboard Tops Apple Patent Requests", CNET News, Apr. 28, 2006, 2 pages.

Wearden, Graeme "Users get a grip on one-handed Linux PDA," www.zdnet.com, Mar. 15, 2002.

* cited by examiner

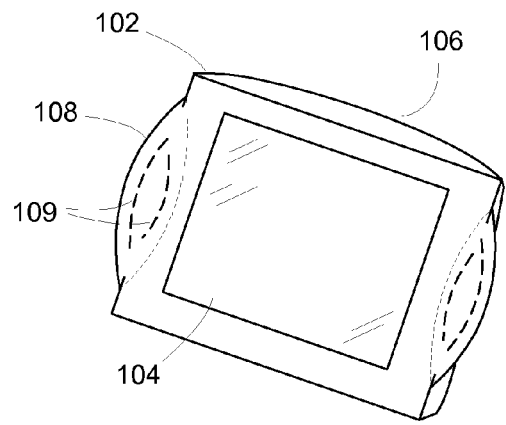
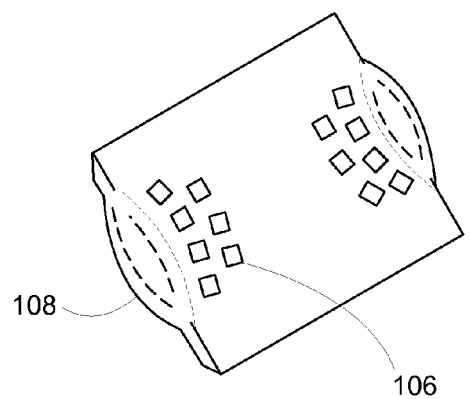
Figure 2a
Figure 2b
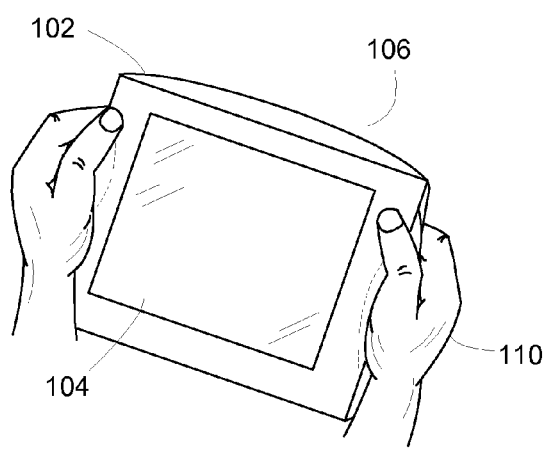
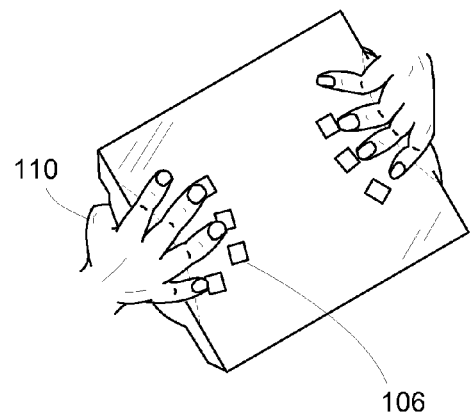
Figure 3a
Figure 3b

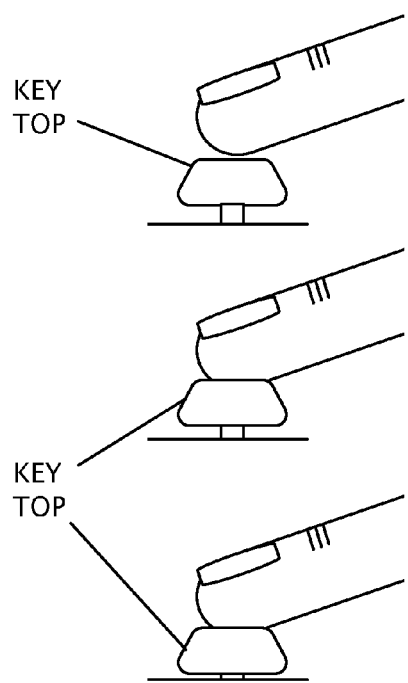
Figure 14a
FINGER IN CONTACT WITH OR PROXIMITY OF KEY
Figure 14b
FINGER APPLYING PRESSURE OR PARTIALLY DEPRESSING KEY
Figure 14c
KEY FULLY DEPRESSED
Figure 14
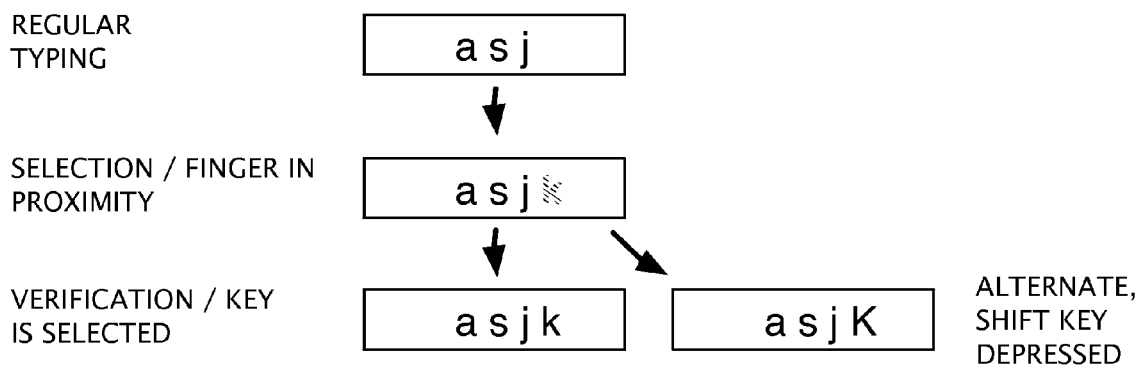
Figure 15

SCHEMATIC OF PRESENTATION
ON SCREEN OF COMPUTER OR
COMMUNICATION DEVICE

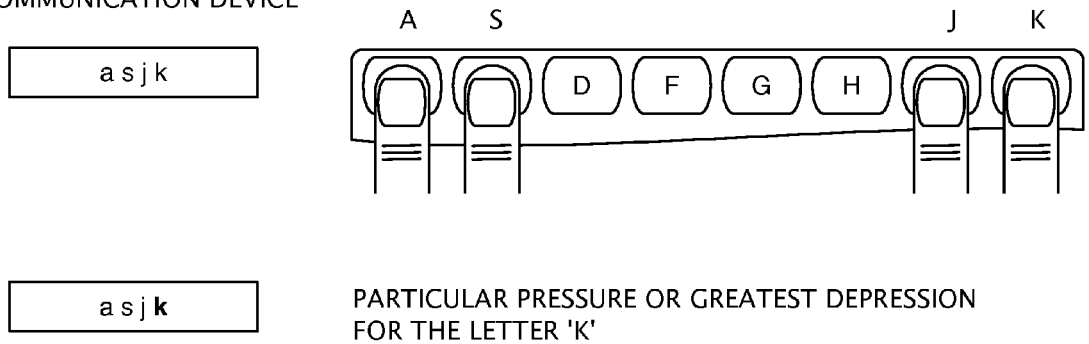

PARTICULAR PRESSURE OR GREATEST DEPRESSION
FOR THE LETTER 'K'

Figure 16

TYPING IN PLACE ON THE DISPLAY:

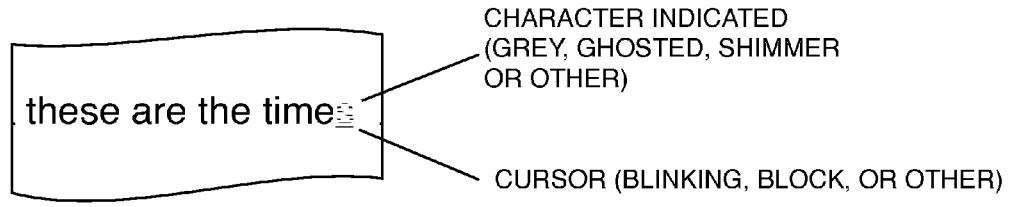

CHARACTER INDICATED
(GREY, GHOSTED, SHIMMER
OR OTHER)

CURSOR (BLINKING, BLOCK, OR OTHER)

IN THIS CASE THE CHARACTER WHOSE KEY IS
MOST DEPRESSED OR UNDER THE MOST PRESSURE
BEYOND A THRESHOLD IS PRESENTED AT THE
CURSOR IN GREY OR GHOSTED, IN THIS CASE A
LOWER CASE "S." THIS CAN AUGMENT OR
REPLACE THE PRESENTATION DESCRIBED ABOVE.

Figure 17

SYSTEM AND METHOD FOR PROVIDING A KEYBOARD TYPE INTERFACE FOR A COMPUTING DEVICE

CLAIM OF PRIORITY

This application claims priority from U.S. provisional application entitled "SYSTEM AND METHOD FOR PROVIDING A KEYBOARD TYPE INTERFACE FOR A COMPUTING DEVICE" Application No. 60/363,165 filed Mar. 11, 2002, and which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to human-machine interfaces, and is particularly related to an interface for a computing device.

BACKGROUND

In today's modern society personal computing devices have become ubiquitous. Many people have two or more of such devices, and their use has become an important part of today's fast-paced and ever more connected economy. As we go about our daily lives we rely on personal computing devices for business, entertainment, communications, personal development, and other reasons. We use them for surfing the Web, checking email, creating documents, making purchases online, sending and receiving faxes, playing games, etc., and rarely a day goes by that a new personal computing device is not created that supposedly helps make our life easier, richer, and more convenient.

When most people refer to a personal computer device they commonly think of the Personal Computer (PC) or desktop style computer. However, the needs of modern society have demanded that personal computing devices become increasingly more portable. Such demands have also caused computing devices to infiltrate every area of society. Nowadays, it is not uncommon to use a laptop on your commute into work, occasionally checking your calendar on your portable digital assistant (PDA), while your child takes a handheld Gameboy™ or similar type of electronic gaming device into school. At the same time, you may get deliveries from a UPS or similar delivery service whose employees use a PDA-style handheld device for tracking packages. Police and traffic officers use similar handheld devices for writing citations and tickets. The many varieties and uses of such devices are more and more widespread everyday.

Of course, such personal computing devices are rarely passive or just display information in a merely passive or read-only manner. Typically, they allow the user to input information into the device and/or to retrieve information from the device. The most common output device is still the display screen. Much work has been done in the past few years to develop new types of display screens that are very small and lightweight, yet are clear and of high resolution. Such display screens are ideal for portable computing devices, and have appeared in everything from handheld PDA devices, to portable cellular telephones. In many recently developed implementations, such as the PalmPilot from 3Com, Inc., the display screen is also used as the primary input mechanism in that it incorporates a touch sensitive screen, and portions of the screen accept stylus strokes to render characters and accept commands.

In recent years many new methods and devices for entering text and commands into personal computing devices have debuted, and some have met technical and/or commercial success. These include folding keyboards, half keyboards, chorded keyboards, handwriting recognition, voice recognition, dials, rocker pads, and a variety of button shapes and arrangements.

Yet, with all of these innovations, the full standard western keyboard is still in demand, and required for commercial success, usually as a standard accessory or as an available inexpensive addition.

If anything, the full standard keyboard is used and known by far more people with more dexterity and speed than ever before, and this trend is accelerating year by year as more people acquire computing devices, and as each person who owns or uses them acquires more than one device. This standard keyboard form is sometimes referred to as the 'QWERTY' keyboard, for its usual arrangement of letters on the top row of alphabetic characters, although it varies from country to country, and from language to language, to some degree. It includes a distinct key for every letter of the English alphabet, each digit, specific non-English characters as needed, and many other common characters. Many non-Western countries with incompatible or radically different writing systems nevertheless use this kind of keyboard for entry of words and commands, sometimes in English to accommodate needs or preferences, and at other times in their native writing system through a variety of methods, sequences, and combinations.

While the most common personal computing device is still the laptop (often referred to as a portable desktop, notebook computer, or simply as notebook), interface mechanisms found on today's laptop are typically the same as those that have been common in laptops for the past twenty years. Laptop cursor-related interfaces, such as Trackpoint™ mechanisms and touch sensitive pads have greatly enhanced the ability to move the cursor around the screen, but despite all that has been done to enhance the functionality of the key board mechanism used to input the more substantial amounts of data into the device, laptop devices almost without exception still incorporate a full keyboard device (or simply a keyboard). The keyboard is usually attached and hinged to the other laptop mechanisms and display in order to enter data. One of the problems with this method is that the laptop is then much larger than it really needs to be. In addition, the hinge type mechanism requires that electrical connections have to be connected between the keyboard and the display part of the laptop, making it more complex to design, and prone to failure during frequent opening and closing. Having such a hinged or clamshell device also means that the laptop is difficult to use while standing, or in areas that do not have a steady and flat surface upon which to place the laptop.

Some PDA devices have mimicked the operation of the laptop by providing a keyboard hinged or otherwise attached to the PDA device itself. In many instances the keyboard is an optional attachment that can be coupled to or decoupled from the device at will. Such PDA devices however, while an improvement, typically suffer from the same problems associated with laptops. A common problem is that the added keyboard adds complexity to the manufacturing process, is prone to failure, and is cumbersome to use particularly when standing. In addition, the PDA keyboards available typically use smaller keys that make it difficult to type with. A number of companies have developed full-size keyboards that can be removably attached to a PDA device by a connector cable and that allows the user to attach the keyboard for occasional entry of data. However, these full-size keyboard devices still suffer from the fact that they must be placed on a rigid surface in order to provide enough support for the user to actually type on.

Some PDA manufacturers, have eliminated the keyboard idea altogether, replacing the input device merely with a set of function keys and perhaps a mouse or a stylus or similar kind of cursor device. The problem with this approach is that, any time extensive data entry needs to be performed, the user must perform it by writing in a stylized entry language on the touch pad, or by using a virtual-style keyboard that appears at request on the display screen. Such methods of entering data are not conducive to fast, accurate, or comfortable typing, and as a result PDA devices are in almost all instances limited to only occasional or minimal data entry.

The problems described above are not restricted merely to laptop devices and PDA devices. All personal computing devices, and equivalent electronic data devices that are designed to be portable, suffer from the same problem of how to provide a user interface mechanism that allows for considerable data input or entry of data, while minimizing the amount of space the interface mechanism actually takes up in or on the device. Devices that suffer from this problem include portable phones, portable game machines such as those from Nintendo™ and Sega™, portable data recorders such as those used by delivery and distribution companies, and medical devices including those used for endoscopic surgery.

With each of these type of devices one primary design dilemma is to minimize the amount of space that the interface mechanism takes up on the device while simultaneously maximizing the amount of display space available to the user, while a second but intimately related design goal is to do this in a manner that makes for fast, convenient entry of data, and that can be used in an intuitive manner.

A combination of these two design elements may be useful in developing a device or an interface that can be used by a user in cramped quarters, while standing up, or with only free hand. Reducing and/or eliminating the number of components that must be used in making such a device would increase the ruggedness of the device and decrease the overall weight and complexity. One may anticipate that such devices will be especially useful in situations that require traveling, for example on airplanes. Whatever mechanism is used, a primary concern is to ensure that the interface is familiar enough to the user that it does not hinder their everyday use and enjoyment of the device.

SUMMARY OF THE INVENTION

Unlike the traditional methods of providing computer interfaces described above, the invention provides a system or interface device which includes an operator interface device, such as a keyboard, that is either permanently or affixably attached to the sides and/or rear of a display device, in such a manner that it can be easily and naturally manipulated by the operator while viewing the display screen. The housing can be suitably designed so as to be comfortably held or grasped substantially within the palms of the operators hand or hands, leaving the fingers free to operate the keyboard while still providing the operator a measure of control in holding the device. This is particularly important in situations in which no desk or worktop is available, or in which the operator simply prefers to stand. Embodiments of the invention may employ key selection and verification devices and methods to assist the operator in successfully navigating those keys that are otherwise hidden from view. Such devices and methods include tactile feedback keys, and displayable key selection devices.

The invention thus provides a human-computer interface mechanism, particularly one that includes a keyboard, that is incorporated into or affixed to a computing device or personal computing device in such a way that the user can operate the device in a fast, easy, and convenient manner, while simultaneously maximizing the amount of available display space to the user. In one embodiment, the greater part of the interface mechanism, (typically although not in every instance including a keyboard), is affixed, coupled, or integrated into the back of the computing device. This allows substantially the entire front of the computing device to be used for display purposes. In accordance with this embodiment of the invention, the user operates the computing device primarily by moving their fingers upon the interface mechanism or keyboard, most of which is hidden from view behind the display device. Some of the interface mechanism or keyboard may be distributed on the front of the device with the display, or along the sides of the device, as necessary or desired. While this distribution of the keys might at first seem unusual to the operator, the invention provides several additional mechanisms and methods and for use with the invention that allows the operator or user to quickly become familiar with this somewhat atypical way of operating the device, and which provide constant feedback and guidance. These additional mechanisms include, but are not limited to, appropriately spaced keys, chorded keyboards, tactile feedback mechanisms, and key selection and verification methods.

One of the features of the invention when incorporated into everyday computing devices is that it maximizes the available display space to the user, while still providing an unexpectedly intuitive, familiar, and usable interface mechanism that includes the maximum amount of keys for use in entering data. Prior to the invention, the space at the back of such computing devices was largely ignored. The invention makes full use of this "retail space", to produce a system that can in some instances be totally handheld, and that requires no support such as a desktop or a table for easy operation. Some mechanical modifications are anticipated that will aid the operator in supporting a laptop or portable device while freeing the fingers and thumbs to enter data and commands. In some devices, additional mechanisms, methods, and configurations are anticipated to allow operation of the device with one hand.

Another important benefit of the invention is the fact that it eliminates the requirement for a hinge between the keyboard and the screen. This type of implementation is much more rugged than the commonly available systems in use today. Since many PDA devices and telephones are carried in the pocket or in the briefcase, the need for a rugged system is ever more important. Eliminating the hinge mechanism also reduces the wiring requirements for such devices, and reduces the complexity and number of parts that are required in actually making the case for the device.

BRIEF DESCRIPTION OF THE DRAWINGS

FIGS. 2a-2b shows an illustration of a front view of a typical interface of the invention.

FIGS. 3a-3b shows an illustration of a back view of a typical interface of the invention.

FIG. 14 shows a keystroke sensing mechanism in accordance with an embodiment of the invention.

FIG. 15 shows a key selection and verification mechanism in accordance with an embodiment of the invention.

FIG. 16 shows a multiple key presentation mechanism in accordance with an embodiment of the invention.

FIG. 17 shows an illustration of how the operator might see the key selection and verification mechanism in accordance with an embodiment of the invention.

DETAILED DESCRIPTION

Figure 1:
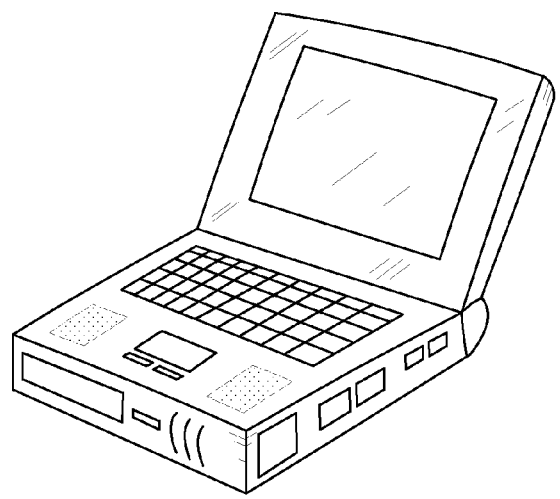
FIG. 1 shows an illustration of a typical laptop, notebook, or personal computer device that might use the invention.

Unlike the traditional methods of providing computer interfaces described above, the invention provides a system or interface device which includes an operator interface device, such as a keyboard, that is either permanently or affixably attached to the sides and/or rear of a display device, in such a manner that it can be easily and naturally manipulated by the operator while viewing the display screen. The housing can be suitably designed so as to be comfortably held or grasped substantially within the palms of the operators hand or hands, leaving the fingers free to operate the keyboard while still providing the operator a measure of control in holding the device. This is particularly important in situations in which no desk or worktop is available, or in which the operator simply prefers to stand. Embodiments of the invention may employ key selection and verification devices and methods to assist the operator in successfully navigating those keys that are otherwise hidden from view. Such devices and methods include tactile feedback keys, and displayable key selection devices.

Generally described, the invention provides a system and a method for allowing a user to operate a personal computing device via a human-computer interface. In many instances the human-computer interface will be a keyboard or keyboard type mechanism, although it may include one or other interface devices and mechanisms, such as trackballs and/or pointer or stick-type devices. An important element of the invention is in its placement of this human computer interface mechanism in a location that maximizes the amount of available display space to the user, while still providing a convenient, easy and sufficiently detailed mechanism by which to enter large amounts of data. Such an interface mechanism can be used in all manner of personal computing devices, for example in personal computers, laptop devices, personal digital assistance (PDA) devices, cellular telephones, electronic handheld type gaming machines, medical devices, and handheld personal computers such as those used by delivery people and law enforcement officers. As used herein, the term "personal computing device" is used to refer to one or all of this large class of computing devices and their equivalents.

One of the features of the present invention is that it takes advantage of the natural position of the hands, and particularly of the fingers, to provide a human machine or human computer interface that seems natural and intuitive. When a person grasps a device such as a PDA or a laptop, the natural positioning of the fingers is at the sides or rear of the device, i.e. in a "natural position". The invention emphasizes this natural positioning of the fingers, by placing the keys in the position on the device where they are most likely to be comfortably used. At the same time, moving the keys to the rear of the device and/or the sides of the device allows the display screen to be maximized to occupy substantially all or most of the frontal device dimensions. The overall result is that a typical device can actually be minimized, while still incorporating a full size keyboard, and including a larger display area. For laptop style devices, this means a larger display area can be easily provided. For PDA style devices, this means increased functionality and ease of data input. These advantages can similarly be useful in other device types and industries including cellular telephones, medical devices, control devices, and entertainment devices. As described above, the shape of the device or the device housing is important in order to be able to accommodate the ease of the user in holding the device, substantially with just the palms and/or thumbs, while still allowing the fingers to move freely and to operate the device. This distinguishes devices designed according to the invention from traditional style devices which are designed primarily to rest on a flat surface, i.e. a table and/or a user's lap, and are not designed to be held in the palm and operated with the fingers.

While some of the implementations described herein include mounting the keyboard and/or other interface mechanism on the back side of the personal computer device in a manner that is atypical for most users to use, the invention includes mechanisms and methods to allow the user to quickly become familiar with the operation of the device and at the same time to provide constant feedback and guidance at all times while in use thereafter. Such mechanisms and methods include tactile feedback and key selection and verification methods that allow the user to quickly become familiar with the layout of the keyboard and/or other interface mechanism, to hunt for the desired key or character as if the keyboard were in view, and to use it in a manner that is efficient and accurate. The invention addresses the issue wherein notebook computers, personal digital assistants, portable telephones, portable game sets, and similar other computer devices suffer from a lack of space for the actual keys or keyboard on the side of the device directly facing the operator (the anterior side). The traditional reason to place the keyboard here is to allow the operator to hunt and peck while using the keyboard. However, the invention draws upon the fact that in the course of the computer revolution more and more people have become touch typists, or at least have become very familiar with using computer devices and computer keyboards. As such, fewer and fewer people need to use this hunt and peck method in order to use a keyboard. The invention also takes advantage of the fact that a flat keyboard can sometimes cause discomfort for the typical user. This discomfort is more pronounced when the keyboard is actually on the front of the personal computer device. The invention takes note of the fact that when a person picks up an object, the fingers naturally tend to wrap around the object. For example, when picking up a book, the thumb is usually at the front of the book with the fingers at the back of the book. This is a natural position for the human hand. As more and more people use such keyboard input devices to regularly, if not frequently, communicate, work and record their thoughts and information, there will be an ever greater demand for an easy, convenient mechanism by which to enter such data while allowing the user to keep their hand in a more natural position. Placing the interface mechanism or keyboard on the back or sides of the computer device (the posterior and lateral sides respectively) is one novel and unexpected feature introduced by the invention to best address these needs.

The invention addresses the primary goals described above of minimizing the amount of space that an interface mechanism takes up on a computer and/or other type of hardware device, while simultaneously maximizing the amount of display space available to the user. The invention may also include mechanisms that allow the user to interface with the device in a convenient and intuitive manner. This can be achieved through a variety of feedback and key verification methods. Using such a device the user can conveniently, quickly and accurately retrieve and/or enter data. Since the overall dimensions of the device can be made much smaller, the invention has applicability in all areas of technology. Although very useful in devices in technologies that are hand held, or a design to be portable, the invention may also be used with any device in which space is at a premium. It's ergonomic features, while somewhat of a side effect of the primary functioning of the invention, encourages deployment of the invention in otherwise everyday devices to provide a better level of comfort for the user.

The invention thus addresses those objectives and goals described above that include providing a computer or system interface that can be used by a user in cramped quarters, for example, on an airplane or train seat, or in a car. Similarly, embodiments of the invention are well suited for use while standing, or with one hand allowing the other hand to remain free. Since embodiments of the design may be kept simple and lightweight, the overall result is an increase in the ruggedness or durability of the device. The savings in weight and complexity combined with ease of use and manipulation allow for a wider variety of applications, together with associated lower manufacturing costs. Embodiments of the invention may also include mechanisms to improve the readability of the device, for example placing the user display closer to the user's face, while still allowing accurate data entry. Since insuring a comfortable and accurate data entry mechanism is an important goal of the invention, several embodiments include verification and key selection mechanisms, that allow an operator to accurately enter data, while at the same time improving their speed of data entry compared to traditional methods. The design of the interface lends itself particularly well to blending with the learning curve of an operator in using the device, and allowing the operator to gain a familiarity with everyday usage. To this end, the keys used for data entry may be arranged in a familiar pattern common to most people, or in some embodiments arranged in a manner that is more optimal for data entry.

Interface Mechanism

The invention will now be described with reference to the accompanying figures. To begin, we discuss the problems inherent in the traditional mechanism by which to attach a keyboard to a personal computer device. FIG. 1 illustrates a typical laptop computer. As can be seen in FIG. 1, the screen is typically attached to the keyboard by means of a hinge or similar coupling or connecting mechanism. As discussed above, this hinge mechanism increases the complexity of the laptop computer case. In addition, having the screen and the keyboard separate in such a way requires more physical space in which to open up the personal computer and to use it. Particularly, it is difficult to use such a portable computer without resting it on a level stable surface such as a table or desk. This is because the user must use the standard keyboard with both hands, which does not allow the user to actually support the keyboard by themselves. If there was some way to support the personal computer in the user's hands, then a need for a support such as a desk would be eliminated.

FIG. 2 illustrates a typical device that might include an embodiment of the invention. In particular, FIG. 2A illustrates a front or anterior view of the device, while FIG. 2B illustrates a back or posterior view. In it's simplest form, the invention includes a housing 102, which can be made from any convenient material, including plastic and/or fiberglass and/or any metallic material. Such materials are well known to the laptop and computer manufacturing industry. Incorporated within and accessible to the user is a display screen 104. The display screen may be any type that is commonly used in PDA and laptop devices, including thin film transistor and plasma displays. While these types of displays are given for exemplary purposes, it will be evident to one skilled in the art that other display types may be used with the invention. Hidden from view in FIG. 2A, but illustrated in FIG. 2B, is a set of user interface mechanisms, including any of a key board, and/or trackpoint, a stick type, or trackball device. Placing the display screen, and the interface mechanism on opposing sides of the housing 102, allows the display screen to be maximized to occupy substantially the entire front of the device, while still allowing a full size keyboard for user input. To better assist in holding the device during use, the enclosure may include a set of protrusions or nubs 108, which assist the user in holding the device while the keys are being used. As shown in FIG. 2A and FIG. 2B, these protrusions on either side of the display allow the device to rest comfortably within the user's palms, and their fingers to float independently, so that the fingers may operate the keyboard. The ability to hold the device substantially in the palm of the hand or hands, while allowing the keys to move freely, is an important element of the invention. Although the protrusions shown in FIG. 2A are drawn quite large for ease of illustration, it will be evident to one skilled in the art that the protrusions need only be large enough or appropriately shaped to assist the user in holding the device. In other embodiments, the protrusions may actually be built into or embedded within the housing itself rather than protruding from the device. Regardless of the mechanism used, the invention generally includes some mechanism by which the user's grasp on the device is accentuated and yet leaves the fingers free to move. To this end, a series of ridges and/or texturing 109, may also be applied to the protrusions to assist in holding the device. It will also be evident to one skilled in the art, that while protrusions are used in this embodiment of the invention, the invention may equally be used with other housing design styles, that do not require protrusions, but provide some other means by which the user can hold the device substantially within the palm and/or palms of either one or both hands, while allowing the keys to be freely used by the fingers.

FIG. 3A and FIG. 3B illustrate front and back views of the device during use as it may be used by a user or operator. As shown in FIG. 3A, the operator grasps the device in one or both hands 110, which allows the fingers of the hand move freely over the keyboard 106. In this embodiment, the thumbs rest on the front side of the device, while the fingers rest on the rear, although it will be evident to one skilled in the art that other keyboard layouts may be used within the spirit and scope of the invention. As can be seen in FIG. 3A, the invention allows a wider display screen to be used, substantially the entire front of the device, while still providing the full use of the keyboard.

Figure 4:
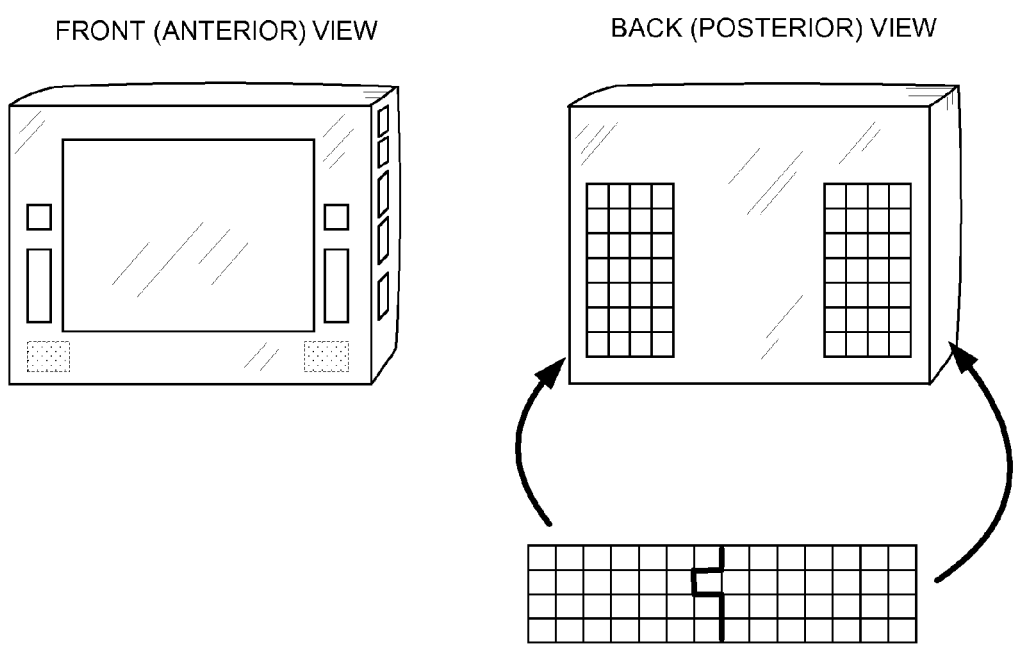
FIG. 4 shows an illustration of a personal computer device such as shown in FIG. 1 that incorporates an embodiment of the invention.

FIG. 4 illustrates one embodiment of the invention as it might be used with a portable computer device such as previously shown in FIG. 1. As can be seen from the front of the device the portable computer device appears to the user as just a regular laptop screen. Typically, the screen would be the same dimensions as a standard laptop device. FIG. 4A illustrates the front or anterior view of the device, while FIG. 4B illustrates the rear or posterior view, in accordance with one embodiment of the invention. As can be seen from FIGS. 4A and 4B, the keyboard mechanism is substantially deployed at the rear of the device. In this particular embodiment the keyboard is a standard QWERTY style keyboard that is split, so that a first half is operated by the left hand and second half by the right hand. To operate this type of personal computer device, the operator holds the device in both their left and right hands so that the front view appears to the operator, and so that they can see the screen. When held in this manner, the operator's thumbs will rest upon the space bars on the front of the device while their fingers wrap around, and are able to operate the keyboard mechanism at the rear of the device. Distributing the keys in this manner allows the computer device to be totally handheld, while still offering the full keyboard mechanism that many operators are familiar with using. Although the keyboard itself is at the rear of the device and hidden from the operators field of view, it follows a standard keyboard layout so that many typists who are familiar with touch typing should have no problem quickly becoming familiar with operating the device. The advantage in providing a keyboard that is distributed across the front and the back of the computer device in this manner, is that the front of the computer device is maximized for display purposes, while the computer device itself is still portable and capable of being held in the hand.

Figure 5:
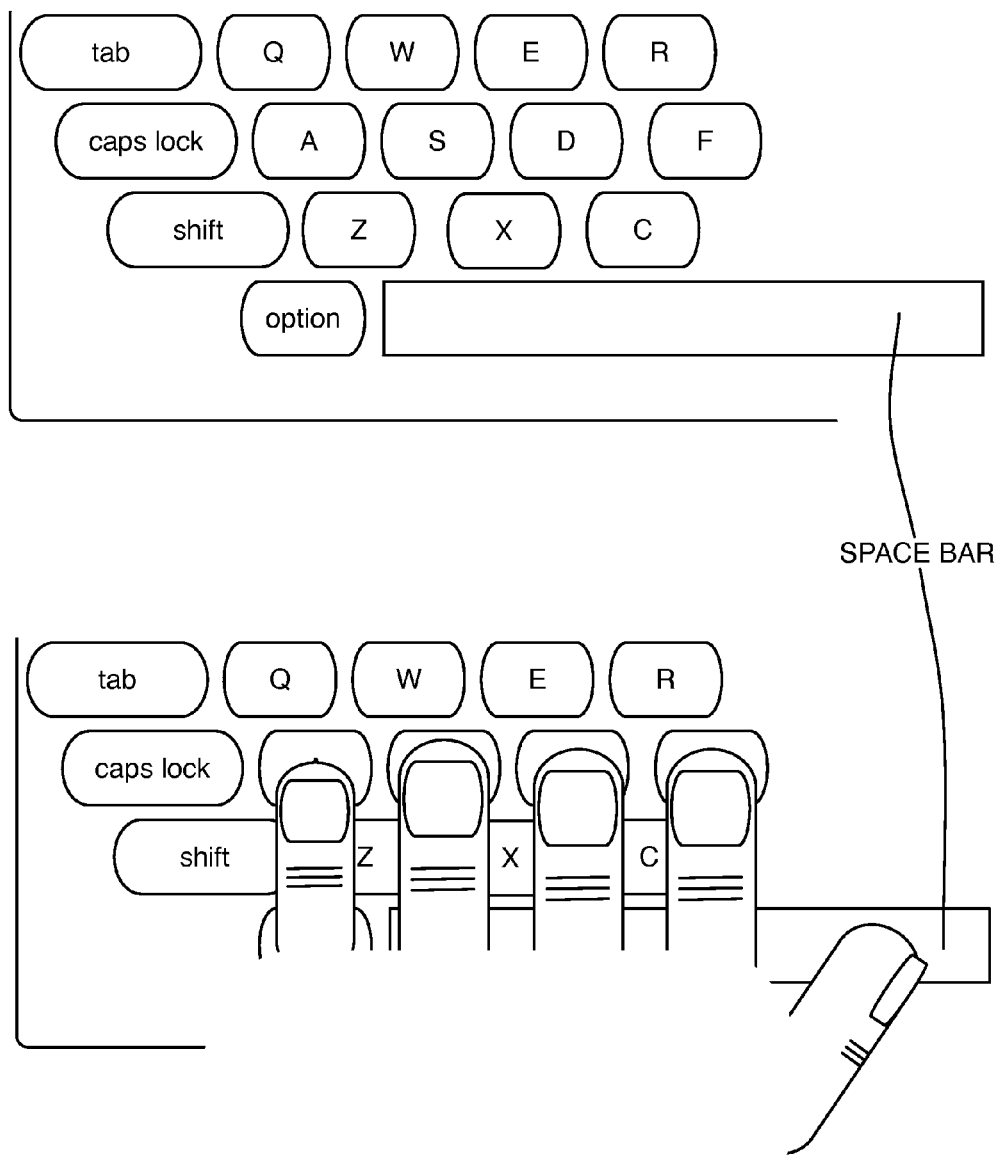
FIG. 5 shows a typical computer keyboard layout.

FIGS. 5A and 5B illustrate the layout of a standard American keyboard for use with the English language and further showing how it is used by an operator. As can be shown therein the standard qwerty style keyboard has the keys arranged in such a fashion as to mimic the placement of the operator's fingers. In this type of keyboard layout the operator's four fingers rest substantially over the A, S, D and F keys. One of the problems with this layout is that the thumb typically is forced to rest on or over the space bar. This is not a natural position in which to place the thumb. As described in further detail below the invention includes keyboard layouts, positioning, and mechanisms that allow the hands to fall in a more natural position.

FIGS. 6A through 6D illustrate how a keyboard mechanism in accordance with an embodiment can be attached to a small personal computer device and/or PDA device. As can be seen in FIG. 6A, from the front of the device the PDA appears just as a regular PDA device. One element that is not commonly found in PDA devices however is the addition of added controllers on the front of the PDA at the left and right hand sides of the device. FIG. 6B illustrates a top view of the device. As can be seen in FIG. 4b, the keyboard mechanism can be stored in a folded manner at the rear device. FIG. 6C shows the device expanded for use by the operator. The keyboard mechanism may be deployed by any variety of means including by a latch or a push button mechanism. When fully deployed as in FIG. 6C, the keyboard substantially resembles that of FIG. 2, in which the keyboard has a split qwerty style layout. FIG. 6D illustrates the use by an operator in operating the mechanism. As can be seen in FIG. 6D, when in use by the operator, the operators thumbs fall naturally across the front of the PDA device where they can be used to operate the space bars and/or other function keys. The operators fingers wrap around the PDA device where they can be used to touch type against the split keyboard. In this manner, the keyboard interface mechanism in accordance with the invention allows for a more ergonomic approach to human-computer interfaces. Although in this embodiment, the operators thumbs are used to operate the space key(s), they could equally be used to operate a variety of functions keys along the front of the invention, while the operators fingers are used to enter data via the qwerty style keyboard mounted at the back of the PDA.

Figure 6:
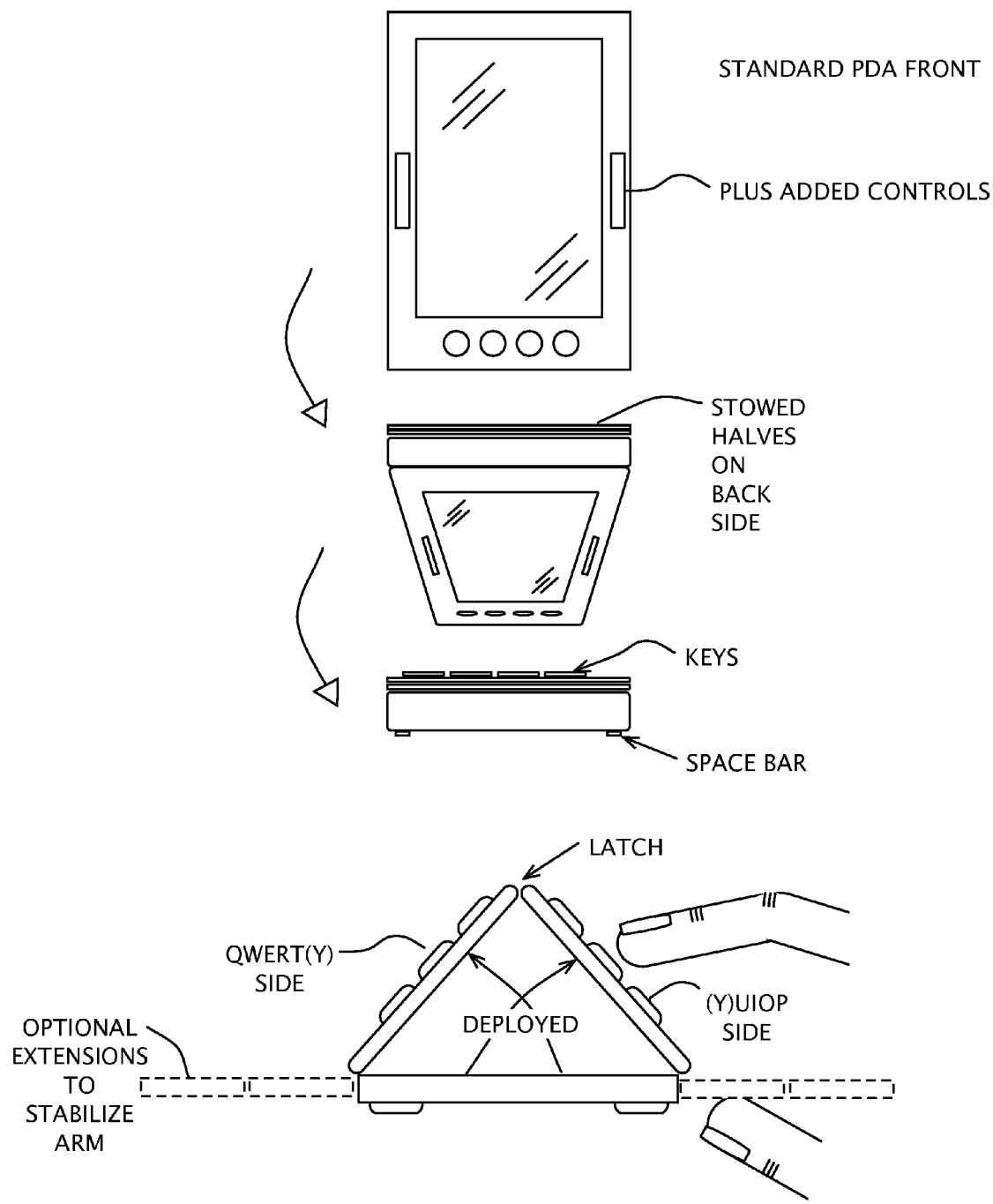
FIG. 6 shows a PDA with keyboard interface mechanism in accordance with an embodiment of the invention.
Figure 7:
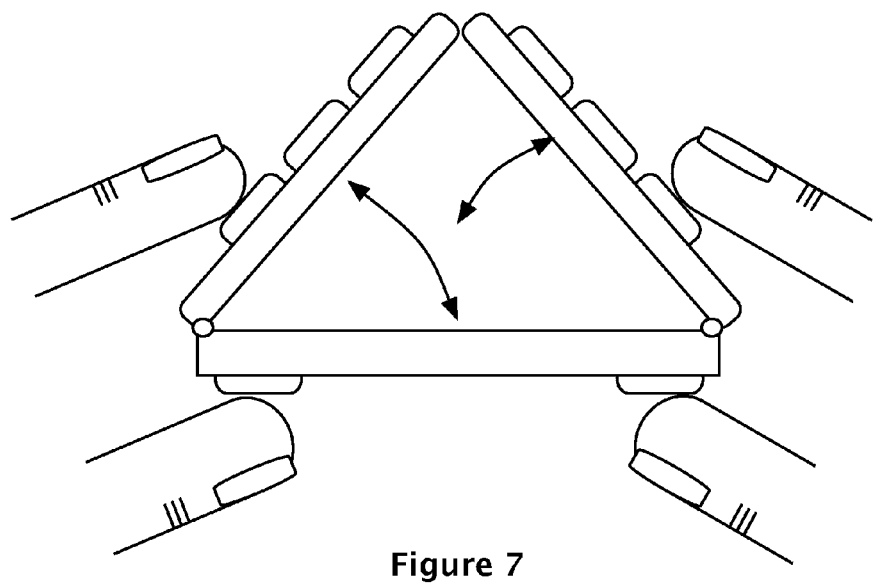
FIG. 7 shows an illustration of a user operating the PDA device of FIG. 6 in accordance with an embodiment of the invention.

FIG. 7 illustrates how the device of FIG. 6 may be used by the operator. As can be seen in FIG. 7, when the keyboard is properly deployed, and the PDA device held in the operators hands, the fingers of the operator's left hand fall over the QWERTY side of the keyboard interface mechanism located at the rear of the device. The fingers of the operator's right hand fall over the UIOP side of the keyboard. The operator's thumb rest over the space key and/or function keys located at the front of the device. Since the fingers and thumbs are diametrically opposed to each other on either side of the device they can be used to grip the device, eliminating the need for any additional (external) support, such as a desk or table. Furthermore, since the majority of keys are located at the rear of the device, a large (maximal) area of the front of the PDA can be used as a display or view area.

Figure 8:
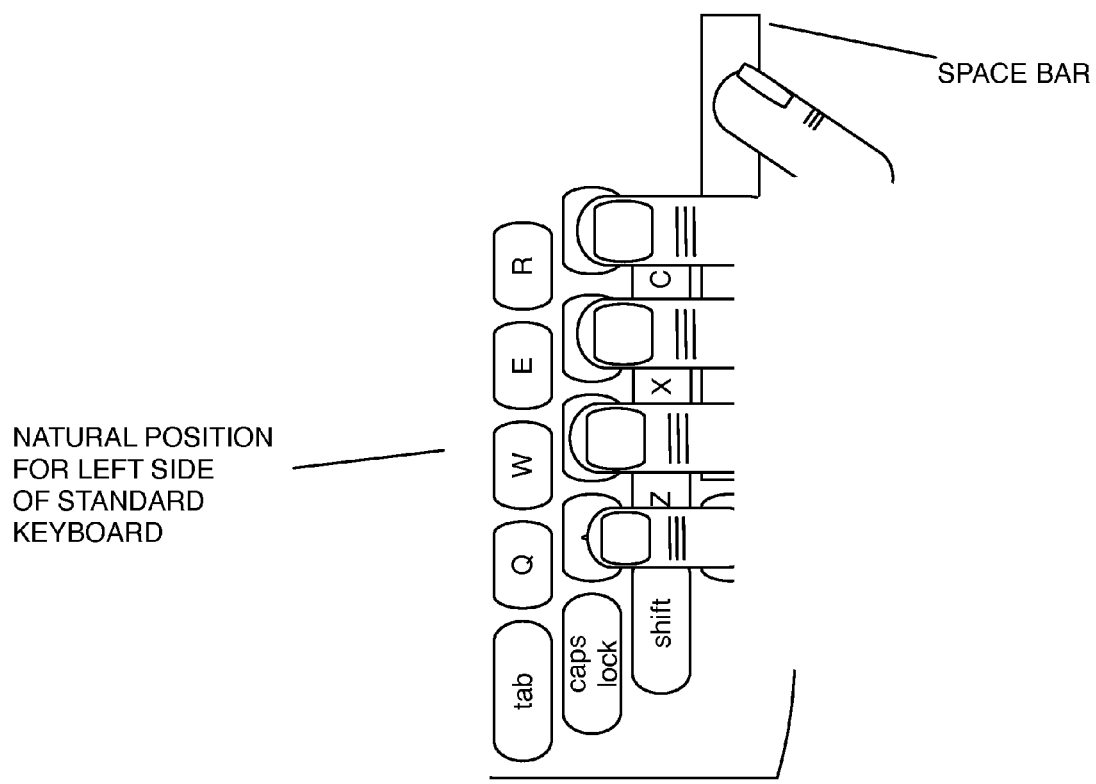
FIG. 8 shows a computer keyboard layout in accordance with an embodiment of the invention.

FIG. 8 illustrates a view from the back or posterior side of the PDA device, showing how the operator's fingers fall naturally across the keyboard. As can be seen from the view in FIG. 8, the operator's fingers fall naturally across the keyboard, while the thumb is used both to support the PDA device and to operate the space bar and/or function keys.

Keyboard Design

An important consideration when providing any kind of keyboard mechanism on a small handheld computer or PDA device is how to locate the entire keyboard in such a way that it does not increase the size of the device itself. Typically, most keyboards are arranged in such a way that there is a lot of available space between the actual keys. This space is necessary during use to provide for comfortable keyboarding. However, the inventors note that even though the spaces are required while the keyboard is actually in use, they are not required when the keyboard is not in use, i.e., when it is stored.

Figure 9:
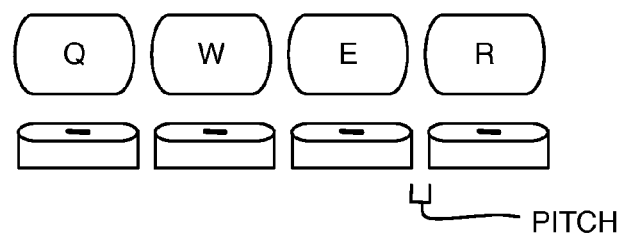
FIG. 9 shows a typical keyboard key spacing.

As can be seen in FIG. 9, a large amount of space between the keys in a standard keyboard is otherwise wasted. The effective area of the key is typically much less than the total area taken up by the keyboard. Several embodiments of the invention take advantage of this wasted space to provide a full size keyboard that when deployed is comfortable to use but when not in use can be stored in a minimal amount of space at the rear of the personal computing or PDA device so as to minimize the overall size of the device.

Figure 10:
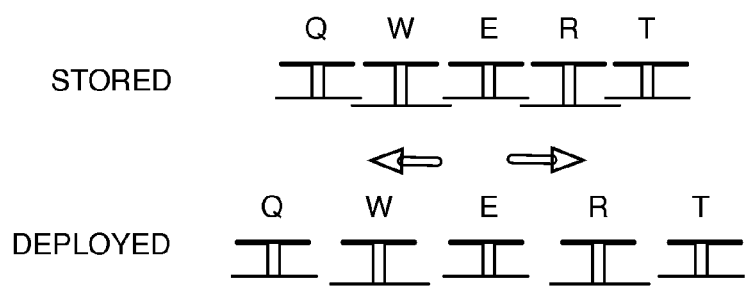
FIG. 10 shows a keyboard key spacing in accordance with an embodiment of the invention.

FIG. 10 illustrates just one of the possible implementations to accomplish this. As shown in FIG. 10, in the deployed mode the keys are arranged in a traditional manner with a number of space between each key. In the stowed mode, the keys are arranged or stacked closely together to minimize the amount of space taken by the keyboard. Alternate embodiments of this design may include the use of a flexible keyboard membrane.

Figure 11:
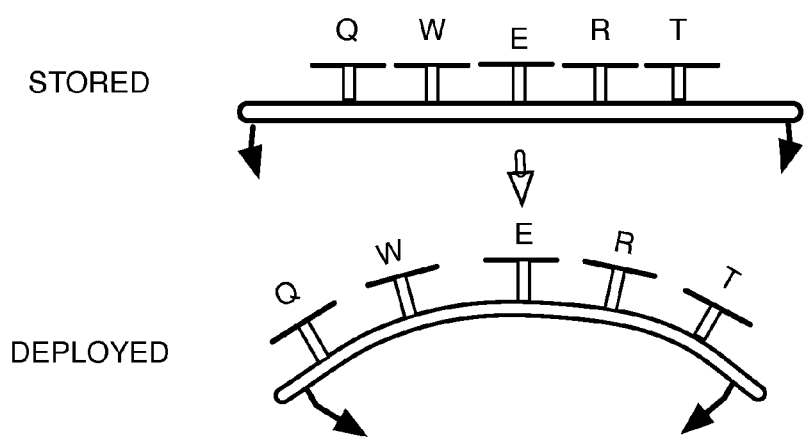
FIG. 11 shows a flexible membrane keyboard in accordance with an embodiment of the invention.

FIG. 11 illustrates one such keyboard implementation. As can be shown in FIG. 11 the keys may be attached to a flexible membrane that can be shaped to configure most ergonomically to the user's hand. Allowing the keyboard to bow or bulge out in such a manner increases the available surface area of the keyboard, making it easier to type on. When the keyboard is stowed the flexible membrane can be flatten to minimize the amount of space it takes up on the computer device.

Figure 12:
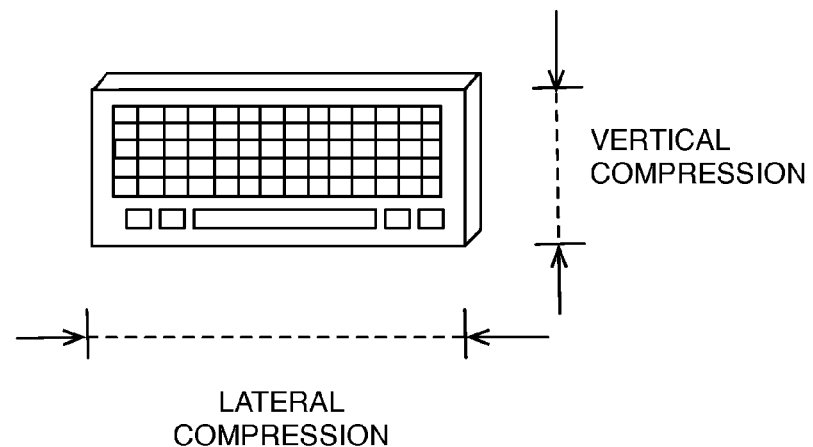
FIGS. 12a-12c shows a variety of keyboard storage and compression mechanisms in accordance with an embodiment of the invention.
Figure 12:
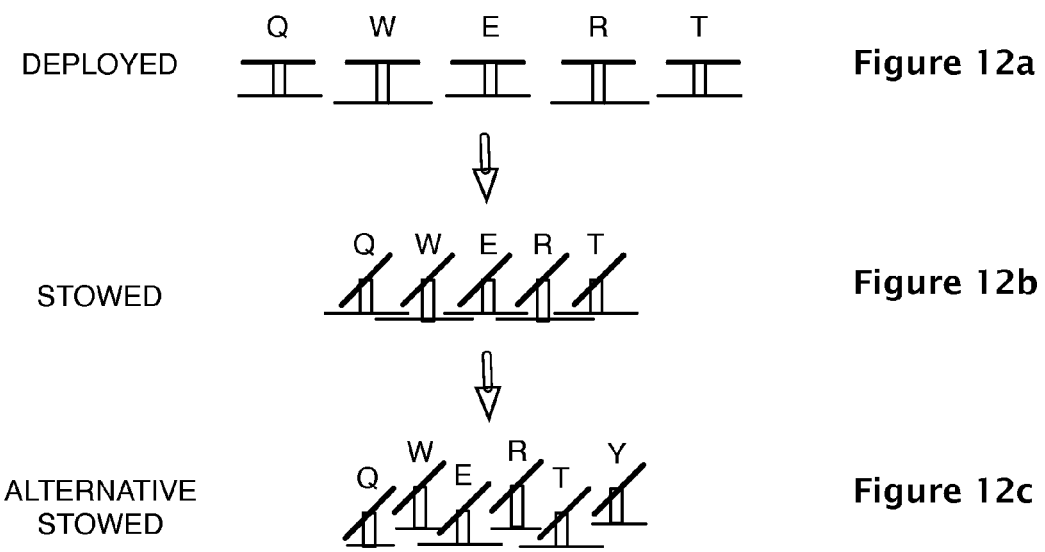

FIG. 12 illustrates another mechanism by which the keyboard can be configured to take up a normal amount of space when deployed, while capable of being stored in a much smaller space. As referred to herein, this is called "compression" of the keyboard mechanism. FIG. 12A illustrates a typical deployed layout of the keyboard. FIG. 12B illustrates a stowed mechanism in which the keys are compressed to take up a much smaller, or minimal amount of space. In FIG. 12B, a form of "lateral compression" is used to reduce the size of the keyboard in a first (lateral) dimension or direction. FIG. 12C illustrates another compression implementation in which the keys are stacked in multiple directions to achieve the minimal amount of space. In this instance, both "lateral compression" and "vertical compression" are used to reduce the size of the keyboard in a first and a second dimension or direction.

Chorded Keyboards

When considering the above implementations of attaching or otherwise affixing a computer keyboard mechanism to a portable computer device, the logical question is "why not just reduce the number of keys?". Of course, the typical answer to this is that there are 26 characters in the alphabet, and hence there is a requirement for at least 26 keys on the keyboard. In addition, most typists commonly use other punctuation characters so there is a need for these too. An obvious problem however is that while the number of keys increases and the fact that these keys are hidden from view, the difficulty of using the interface mechanism becomes increasingly difficult. While this is not envisioned to be a problem to those who are familiar with the skill of touch typing, it can be a problem for those people who are not familiar with the keyboard layout.

To this end, the inventors propose a number of mechanisms for use with the invention that makes it easier for an otherwise inexperienced user to quickly become familiar with the keyboard interface mechanism. These additional mechanisms also serve to reduce the number of keys required on the rear of the device, in accordance with the notion that a reduction in the number of keys makes it both easier to operate the device, quicker to find particular keys and quicker to learn the operation of the device.

Chorded keyboards are not an entirely new idea. They have been used in many types of devices from stenographic machines, to chorded typewriter-style mechanisms. Chorded keyboards have an advantage in the fact that less keys are needed in order to provide the full range of key strokes. The big disadvantage with chorded keyboards is that they are difficult to learn and sometimes have a smaller range of various key strokes compared to traditional style keyboards. The invention provides various additional systems and methods for use with standard keyboards and chorded keyboards to allow them to be easier learned by the user. Generally these systems and methods are referred to herein as "key selection and verification methods".

Key Selection and Verification Methods

Figure 13:
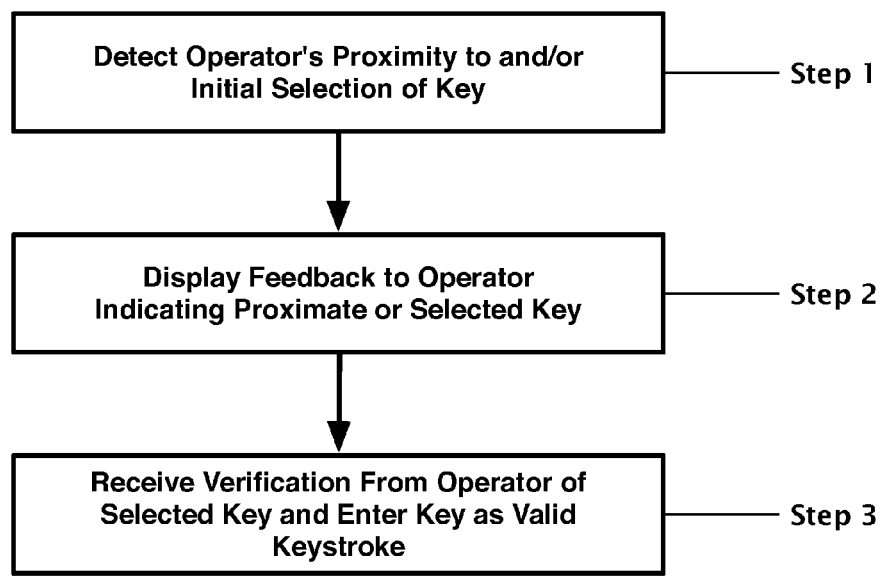
FIG. 13 shows a flowchart of a key selection and verification method in accordance with the invention.

Since embodiments of the invention include a device that mounts the user's display screen in a different portion, and typically on a different side of the device from the actual keys, and furthermore since the keys are usually hidden from the user's view, steps must be taken to ensure that the user can easily select particular keys, and enter data in a convenient manner without causing frustration. To address this, embodiments of the device include key selection and verification methods that allow a user to select a key using touch-typing methods, and to verify that key, indicating a keystroke. FIG. 13 is a flowchart illustrating the essential steps of this method. As shown in FIG. 13, in step 1 the system determines which key the user is close to selecting based either on the position of the fingers some gentle pressure on the key, or on some form of proximity detection. In practice this can be done in a number of different ways, including the use of electrostatic keys and/or touch sensitive keys that measure very small or minute key pressures. Step 2 of the process requires communicating feedback to the user to tell them which key their finger is currently selecting or close to selecting. In step 3, the user must make an active determination to select this key, typically by depressing the key or by making some other form of confirmation. At this point the key is actually verified by the system and entered as a valid key stroke.

While the methods described below are of use in the current invention in which the keys are mounted on the reverse side of a display device, it will be evident to one skilled in the art that the key selection and verification methods described herein are of use in all forms of human computer interaction and even with traditional input devices. Particularly, for those people with visual acuity problems, key selection and verification methods may be of use in using everyday devices that people with normal vision take for granted. In many ways, the addition of key selection and verification methods to normal everyday computers and devices, provide an equalizing balance for user's of poor visual acuity and poor vision. While some of the mechanisms described below include visual feedback to the user via the display screen, it will be evident that other feedback mechanisms can be used, for example vibrating keys or audible feedback, indicating to the user which key is being selected and/or verified as a actual keystroke. Some of the mechanisms described below are of use not just in single key selection methods, but also in selecting keys based on a combination of keys, for example as is used in chorded keyboards.

The advantage of feedback mechanisms such as these are that they reduce user errors in entering data, and increase overall competence with the system. This extra usability is of particular benefit in low light or obscured conditions, for example while using devices on airplanes where the light is low. Feedback mechanisms allow a user to perfect their hunt and peck abilities in finding keys, particularly those that may not be commonly used.

Of course, touch typists do not have to look at the keyboard while they are typing on the keyboard itself, and instinctively know where the K key is. Several embodiments of the invention attempt to provide to the hunt and peck and two fingered typists the advantages already known by the touch typists in being able to quickly and rapidly select a key without having to actually look at the keyboard device itself. This applies not only to keyboards placed deliberately out of sight, but to many other situations, including the use of standard keyboards in low-light situations, and awkward geometries, for example under a table at a meeting, for example, using a long wire or a wireless keyboard, and using an input keyboard device in many repair and medical situations.

One of these implementations involves the use of a touch sensitive key. FIG. 14 shows the use of a touch a proximity sensitive key to provide a key selection and verification mechanism. As shown in FIG. 14A, as the finger is placed in contact with or proximity with the key, a touch or proximity sensor connected with the key indicates to the system that the user or operator has selected, or is in the process of selecting that key. The system may respond in an appropriate manner, described in further detail below. A similar effect can be created by providing keys that operate in partial- and fully-depressed modes, similar to the auto-focus control on many modern cameras. As shown in FIG. 4B, when the key is partially depressed it triggers the key selection and verification process, as before. Regardless of whether a touch sensor, or partial depression sensor is used, when the key is fully depressed, as shown in FIG. 14C, the system recognizes this as a key verification, and transmits the appropriate keystroke to the screen or software application being used.

As described above, the touch sensitive key can operate in a number of different ways. In accordance with one embodiment the touch sensitive keys operate in a two-position mode. When slightly depressed, the key is activated but not so much as to actually indicate a key stroke. When the key is fully depressed, the key stroke is indicated as it would be with a typical keyboard device. An alternate implementation involves the use of electro-static or other proximity sensors on each key. As the fingers placed close to or on the key the key senses the finger and displays the key in an appropriate manner but does not record a key stroke. Only when the key is actually depressed is the key stroke input and recorded.

Regardless of the key selection and verification method used, the invention allows for a typist who may not be a touch-typist, and who may not be able to see the keyboard interface, to interactively search for and select keys by touch. Since the operator always has access to the display, the mechanisms described herein typically indicate on the display what the key selected is prior to verification. As shown in FIG. 15B, when the finger is placed for example on the "k" key, the display device may indicate that the "k" key is depressed perhaps by ghosting or by bolding the "k" key on the screen. If the shift key is also depressed at the same time, then the operator may see on their screen a ghosted or bolded upper case "K" character. Note that even though the selected key is displayed on screen either as a ghosted, bolded or separate color character, the key is not actually inserted into a document until the key itself is depressed or otherwise verified. In this way, the operator gets a preview of the key that they are about to select, prior to actually hitting or selecting the key itself. The key indication can be in a special area of the screen, in the place where it will be entered, or both.

FIG. 16 illustrates a different implementation in which all keys currently touched and/or in proximity are indicated. Again as discussed above, one letter may be emphasized over the others if it is more depressed or under the most pressure, indicated for example by a bolding or a different color letter on the screen. In the example shown in FIG. 16, when the operator finally depresses the K and shift keys, the letter "K" is inserted into the document. An example of how the user may see the feedback is shown in FIG. 17.

INDUSTRIAL APPLICABILITY

The invention has potential uses in a wide range of industrial applications, including, but not limited to the following:
Personal computer devices, laptops, and notebooks, particularly those that are to be used in ruggedized or industrial applications wherein a hinged keyboard mechanism would pose a point of failure, or wherein there is little or no external support upon which to rest a typical clamshell design device.
Portable data devices, digital assistants, and PDA's that could use an additional mechanism of entering data beyond the basic means provided through touch-sensitive keypads and stylized data entry languages.
Portable accessories such as cellular telephones that typically have little or no data entry means, but could use one, particularly one that could be used in a handheld manner, and perhaps with a single hand.
Entertainment devices that allow the user to grasp the device and control various functions without having to move the hands over the device.
Ergonomic keyboards for computers and other machines that allow the user to rest the hands in an intuitive and comfortable manner, and achieve high rates of data entry.
Medical devices that could benefit from having a display screen incorporated within a surgical and/or investigative instrument, wherein the display screen includes interface mechanisms, keyboards and function keys attached to the rear of the screen in a manner that allows for fast and accurate data input, while keeping the operators hands out of the field of view and providing the operator with clear view to the screen.
Military control devices that present a display to the operator, coupled with a rugged data input mechanism affixed to the display that allows maximum, fast selection of independent functions, while keeping the operators hands away from the front of the display.

The above examples are given to illustrate the wide variety of potential uses and applications of the invention. It will be evident to one skilled in the art that the invention is not limited to those variation described above, but that many other variations, implementations, and applications can be developed within the spirit and scope of the invention.

The foregoing description of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A key sensing interface for one of a laptop computer, personal digital assistant, or other electronic device, comprising:
a display located on the laptop computer, personal digital assistant, or other electronic device, and wherein the display is viewable to a user of the device, for use in displaying a document having characters in a regular format;
a keyboard or keypad, which includes a plurality of discrete keys, and wherein the keyboard or keypad is positioned relative to the display so that it can be operated by the user while at least some of its plurality of discrete keys are all or partially hidden from the user's view;
a sensing mechanism, which includes a separate sensor associated with each of the plurality of discrete keys, for determining which of the plurality of discrete keys on the keyboard or keypad the user is currently selecting and is about to enter as characters within the document;
a feedback mechanism for communicating feedback to the user, while the user is using the plurality of discrete keys to select and enter characters within the document, by successively denoting, as a succession of interim displayed, ghosted, or other differently formatted characters, a preview of that character indicated by a key or plurality of keys currently selected by the user, including, while the user is selecting from the plurality of discrete keys to enter characters within the document, displaying a preview of the character indicated by the current selection of key or plurality of keys, at a current location in the document as displayed on the display, as an interim displayed, ghosted, or other differently formatted character, and without requiring the user to look at the keyboard;

a verification mechanism allowing the user to confirm their key selection; and a key input mechanism recognizing the confirmation as a valid key stroke or input, wherein each of the plurality of discrete keys on the keyboard or keypad includes as the separate sensor a multi-position switch, and wherein the verification mechanism includes, while the user is typing in the document, allowing the user to depress the key or plurality of keys more fully, from a first non-depressed position to a second partially-depressed position wherein the character is previewed as the interim displayed, ghosted, or other differently formatted character at the current location in the document as displayed on the display, and then to a third fully-depressed position, wherein that same interim displayed, ghosted, or other differently formatted character is then entered into the current location in the document in its regular format, as the valid key stroke or input.

2. The interface of claim 1 wherein each of the plurality of discrete keys on the keyboard or keypad include as the separate sensor a touch-sensitive portion of the key, and wherein said determining is based either on the user's finger pressure on the discrete key to be selected, or on a proximity detection of the user's fingers relative to the discrete key.

3. The interface of claim 1 wherein said feedback includes an audible notification to the user of the key to be selected, or another form of audible notification related to that key.

4. The interface of claim 1 wherein each of the plurality of discrete keys on the keyboard or keypad includes as the separate sensor a multi-position key, and wherein said verification mechanism includes one of allowing the user to make a determination by depressing the key more fully from the second partially-depressed position to the third fully-depressed position.

5. A method of assisting a user to interact with one of a laptop computer, personal digital assistant, or electronic device, comprising the steps of:

displaying a display located on the laptop computer, personal digital assistant, or other electronic device so that the display is viewable to a user of the device, for use in displaying a document having characters in a regular format;

monitoring a keyboard or keypad, wherein the keyboard or keypad includes a plurality of discrete keys, and wherein the keyboard or keypad is positioned relative to the display so that it can be operated by the user while at least some of its plurality of discrete keys are all or partially hidden from the user's view;

determining, using a separate sensor associated with each discrete key, which of the plurality of discrete keys on the keyboard or keypad the user is about to select;

communicating feedback to the user, while the user is using the plurality of discrete keys to select and enter characters within the document, by successively denoting, as a succession of interim displayed, ghosted, or other differently formatted characters, a preview of a character indicated by a key or plurality of keys currently selected by the user, including displaying the character indicated by the key or plurality of keys within a current location in the document as displayed on the display, and without requiring the user to look at the keyboard;

allowing the user to confirm their key selection and recognizing the confirmation as a valid key stroke or input, wherein each of the plurality of discrete keys on the keyboard or keypad includes as the separate sensor a multi-position switch, and wherein the step of allowing the user to confirm their key selection includes, while the user is typing in the document allowing the user to depress the key or plurality of keys more fully from a first non-depressed position to a second partially-depressed position wherein the character is previewed as the interim displayed, ghosted, or other differently formatted character within the current location in the document as displayed on the display, and then to a third fully-depressed position, wherein that same interim displayed, ghosted, or other differently formatted character is then entered into the current location in the document in its regular format, as the valid key stroke or input wherein that same displayed character is then entered into the current location in the document as the valid key stroke or input.

6. The method of claim 5 wherein each of the plurality of discrete keys on the keyboard or keypad include as the separate sensor a touch-sensitive portion of the key, and wherein said determining is based either on the user's finger pressure on the discrete key to be selected, or on a proximity detection of the user's fingers relative to the discrete key.

7. The method of claim 5 wherein said feedback includes an audible notification to the user of the key to be selected, or another form of audible notification related to that key.

8. The method of claim 5 wherein each of the plurality of discrete keys on the keyboard or keypad includes as the separate sensor a multi-position key, and wherein said verification mechanism includes one of allowing the user to make a determination by depressing the key more fully from the second partially-depressed position to the third fully-depressed position.

9. The key sensing interface of claim 1 wherein the keyboard or keypad is a chorded keyboard having a reduced number of keys, wherein each character is generated by simultaneously selecting various combinations of keys, and wherein the system determines which combination of keys the user is about to select and displays the character associated with the combination of keys, on the portion of the display, to allow the user to confirm their selection by further depressing or applying additional pressure to the same combination of keys.

10. The method of claim 5 wherein the keyboard or keypad is a chorded keyboard having a reduced number of keys, wherein each character is generated by simultaneously selecting various combinations of keys, and wherein the system determines which combination of keys the user is about to select and displays the character associated with the combination of keys, on the portion of the display, to allow the user to confirm their selection by further depressing or applying additional pressure to the same combination of keys.

11. A system for providing an electronic device with a keypad and a displayed key feedback, comprising:
an electronic device including a display viewable to a user of the electronic device, for use in displaying a document having characters in a regular format;
a keypad positioned relative to the display and including a plurality of discrete keys so that it can be operated by the user while at least some of its plurality of discrete keys are all or partially hidden from the user's view;
a sensor for determining which key or plurality of keys on the keypad the user is currently selecting and is about to enter as characters within the document, including a separate sensor associated with each discrete key;
a feedback logic for communicating a feedback, while the user is using the plurality of discrete keys to select and enter characters within the document, by successively denoting, as a succession of interim displayed, ghosted, or other differently formatted characters, a preview of that character indicated by a key or plurality of keys currently selected by the user, including displaying that character associated with the key or plurality of keys within a current location in the document as displayed on the display; and
a verification logic for receiving a confirmation from the user as to the key displayed on the portion of the display, and recognizing the confirmation as a valid key input, while the user is typing in the document,
wherein each of the plurality of discrete keys on the keyboard or keypad includes as the separate sensor a multi-position switch, and wherein the verification mechanism includes
allowing the user to depress the key or plurality of keys more fully
from a first non-depressed position to a second partially-depressed position wherein a character is previewed as the interim displayed, ghosted, or other differently formatted character within the current location in the document as displayed on the display and
then to a third fully-depressed position wherein that same interim displayed, ghosted, or other differently formatted character is then entered into the current location in the document as the valid key input.

12. The system of claim 11 wherein the electronic device is a computer and the keypad is a computer keyboard located all or partially on the back of the computer.

13. The system of claim 11 wherein each of the plurality of keys on the keypad includes a touch sensitive surface, and wherein each of the plurality of keys can also be depressed, and wherein the system uses the touch sensitive surface to determine which key on the keypad the user is about to select and provide the feedback, and then receives confirmation from the user when the key is depressed.

14. The system of claim 11 wherein the keypad is a chorded keyboard having a reduced number of keys, wherein each character is generated by simultaneously selecting various combinations of keys, and wherein the system determines which combination of keys the user is about to select and displays an image associated with the combination of keys, on the portion of the display, to allow the user to confirm their selection by further depressing or applying additional pressure to the same combination of keys.

15. A method for providing an electronic device with a keypad and a displayed key feedback, comprising the steps of:
displaying on an electronic device a display viewable to a user of the electronic device, for use in displaying a document having characters in a regular format;
receiving user input from a keypad positioned relative to the display and including a plurality of discrete keys so that it can be operated by the user while at least some of its plurality of discrete keys are all or partially hidden from the user's view;
determining, using a separate sensor associated with each discrete key, which key or plurality of keys on the keypad the user is currently selecting and is about to enter as characters within the document;
communicating a feedback, while the user is using the plurality of discrete keys to select and enter characters within the document, by successively denoting, as a succession of interim displayed, ghosted, or other differently formatted characters, a preview of that character indicated by a key or plurality of keys currently selected by the user, including displaying that character associated with the key or plurality of keys within a current location in the document as displayed on the display; and
receiving a confirmation from the user as to the key displayed on the portion of the display, and recognizing the confirmation as a valid key input, while the user is typing in the document,
wherein each of the plurality of discrete keys on the keyboard or keypad includes as the separate sensor a multi-position switch, and wherein the verification mechanism includes
allowing the user to depress the key or plurality of keys more fully
from a first non-depressed position to a second partially-depressed position wherein a character is previewed as the interim displayed, ghosted, or other differently formatted character within the current location in the document as displayed on the display, and
then to a third fully-depressed position wherein that same interim displayed, ghosted, or other differently formatted character is then entered into the current location in the document as the valid key input.

16. The method of claim 15 wherein the electronic device is a computer and the keypad is a computer keyboard located all or partially on the back of the computer.

17. The method of claim 15 wherein each of the plurality of keys on the keypad includes a touch sensitive surface, and wherein each of the plurality of keys can also be depressed, and wherein the system uses the touch sensitive surface to determine which key on the keypad the user is about to select and provide the feedback, and then receives confirmation from the user when the key is depressed.

18. The method of claim 15 wherein the keypad is a chorded keyboard having a reduced number of keys, wherein each character is generated by simultaneously selecting various combinations of keys, and wherein the system determines which combination of keys the user is about to select and displays an image associated with the combination of keys, on the portion of the display, to allow the user to confirm their selection by further depressing or applying additional pressure to the same combination of keys.

19. The interface of claim 1 wherein the interface is used to edit documents, and wherein in the second or partially-depressed position the character is previewed as an interim displayed or ghosted character in a document, but not yet entered into the document, and wherein in the third or fully-depressed position that same displayed character is then entered into that place in the document.

20. The method of claim 5 wherein method is used to edit documents, and wherein in the second or partially-depressed position the character is previewed as an interim displayed or ghosted character in a document, but not yet entered into the document, and wherein in the third or fully-depressed position that same displayed character is then entered into that place in the document.

21. A system for providing an electronic device with a keypad and a displayed key feedback, comprising:
an electronic device which includes a display viewable to a user of the electronic device for use in displaying and editing a document having characters in a regular format;
a keypad positioned relative to the display and including a plurality of discrete keys so that the keypad can be operated by the user while at least some of its plurality of discrete keys are all or partially hidden from the user's view;
a touch sensitive sensor for determining which key or plurality of keys on the keypad the user is currently selecting and is about to enter as characters within the document, including a separate sensor associated with each discrete key;
a feedback logic for communicating feedback about a character indicated by the key or plurality of keys selected or about to be selected, while the user is using the plurality of discrete keys to select and enter characters within the document, by successively displaying the character as a succession of interim displayed, ghosted or other differently formatted character within a current location in the displayed document, but not yet entered into the document; and
a verification logic for receiving a confirmation from the user as to the interim displayed or ghosted character within the current location in the displayed document, including
while the user is selecting from the plurality of discrete keys to enter characters within the document,
allowing the user to depress or further select the key or plurality of keys,
displaying a preview of the character indicated by the current selection of key or plurality of keys, within a current location in the document as displayed on the display, as an interim displayed, ghosted, or other differently formatted character, and without requiring the user to look at the keyboard,
recognizing the confirmation as a valid key input, and then entering the same displayed character into that current location in the document, in its regular format, as the valid key stroke or input.

22. A method for providing an electronic device with a keypad and a displayed key feedback, comprising the steps of:
displaying on an electronic device a display viewable to a user of the electronic device for use in displaying and editing a document having characters in a regular format;
receiving user input from a keypad positioned relative to the display and including a plurality of discrete keys so that the keypad can be operated by the user while at least some of its plurality of discrete keys are all or partially hidden from the user's view;
determining, using a separate touch sensitive sensor associated with each discrete key, which key or plurality of keys on the keypad the user is currently selecting and is about to enter as characters within the document;
communicating a feedback about a character indicated by the key or plurality of keys selected or about to be selected, while the user is using the plurality of discrete keys to select and enter characters within the document, by successively displaying the character as a succession of interim displayed, ghosted or other differently formatted character within a current location in the displayed document, but not yet entered into the document;
receiving a confirmation from the user as to the interim displayed or ghosted character within the current location in the displayed document, including
while the user is selecting from the plurality of discrete keys to enter characters within the document,
allowing the user to depress or further select the key or plurality of keys;
displaying a preview of the character indicated by the current selection of key or plurality of keys, within a current location in the document as displayed on the display, as an interim displayed, ghosted, or other differently formatted character, and without requiring the user to look at the keyboard; and
recognizing the confirmation as a valid key input, and then entering the same displayed character into that current location in the document, in its regular format, as the valid key stroke or input.

23. The interface of claim 1 wherein the keypad is distributed over two or more faces or sides of the laptop computer, personal digital assistant, or other electronic device, including a number of keys on the front of the device and another number of keys on the rear of the device, which keys can all be accessed when the device is held in the hands of the user.

24. The method of claim 5 wherein the keypad is distributed over two or more faces or sides of the laptop computer, personal digital assistant, or other electronic device, including a number of keys on the front of the device and another number of keys on the rear of the device, which keys can all be accessed when the device is held in the hands of the user.

* * * * *